(12) United States Patent
Abdollahian Noghabi et al.

(10) Patent No.: US 12,198,347 B2
(45) Date of Patent: Jan. 14, 2025

(54) MASK FOR SATELLITE IMAGE DATA

(71) Applicant: Microsoft Technology Licensing, LLC, Redmond, WA (US)

(72) Inventors: Shadi Abdollahian Noghabi, Bellevue, WA (US); Ranveer Chandra, Kirkland, WA (US); Krishna Kant Chintalapudi, Redmond, WA (US); Peder Andreas Olsen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 349 days.

(21) Appl. No.: 17/575,406

(22) Filed: Jan. 13, 2022

(65) Prior Publication Data

US 2023/0222667 A1 Jul. 13, 2023

(51) Int. Cl.
*G06K 9/62* (2022.01)
*G06T 7/11* (2017.01)
(Continued)

(52) U.S. Cl.
CPC ............... *G06T 7/11* (2017.01); *G06T 7/174* (2017.01); *G06T 7/70* (2017.01); *G06V 10/25* (2022.01);
(Continued)

(58) Field of Classification Search
None
See application file for complete search history.

(56) References Cited

U.S. PATENT DOCUMENTS 6,983,198 B2 * 1/2006 Weiner ................ B64G 1/10
342/60
7,644,131 B2 * 1/2010 Levanon ............... G06T 3/403
709/217
(Continued)

FOREIGN PATENT DOCUMENTS

CN 112232318 A * 1/2021
CN 112465846 A * 3/2021 ............. G06T 5/002
(Continued)

OTHER PUBLICATIONS

Manyangadze, "Forest fire detection for near real-time monitoring using geostationary satellites." Master's thesis, University of Twente, 2009. (Year: 2009).*
(Continued)

*Primary Examiner* — Feng Niu
(74) *Attorney, Agent, or Firm* — Alleman Hall & Tuttle LLP

(57) ABSTRACT

A computing device is provided, including a processor configured to receive imaging relevance data for a geographic area. The processor may be further configured to generate, based at least in part on the imaging relevance data, image mask instructions specifying a region of interest included in the geographic area. The processor may be further configured to transmit the image mask instructions to a satellite. The processor may be further configured to receive, from the satellite, filtered satellite image data of the region of interest. One or more deprioritized regions of the geographic area outside the region of interest may be excluded from the filtered satellite image data.

18 Claims, 16 Drawing Sheets

(51) Int. Cl.
*G06T 7/174* (2017.01)
*G06T 7/70* (2017.01)
*G06V 10/25* (2022.01)
*G06V 20/13* (2022.01)

(52) U.S. Cl.
CPC .... *G06V 20/13* (2022.01); *G06T 2207/10032* (2013.01); *G06T 2207/20076* (2013.01); *G06T 2207/20081* (2013.01); *G06T 2207/30192* (2013.01)

(56) References Cited

U.S. PATENT DOCUMENTS

| | | | |
|---|---|---|---|
| 8,698,742 B2 * | 4/2014 | Mimura | H04N 1/00424 |
| | | | 345/157 |
| 8,924,506 B2 * | 12/2014 | Levanon | G06F 40/169 |
| | | | 709/217 |
| 9,652,681 B1 * | 5/2017 | Tucker | G06V 10/255 |
| 9,760,805 B2 * | 9/2017 | Wang | G06T 7/20 |
| 9,792,500 B2 * | 10/2017 | Pennypacker | G06F 18/217 |
| 10,114,149 B2 * | 10/2018 | Bharadwaj | G01W 1/02 |
| 10,178,499 B2 * | 1/2019 | Regan | B64G 1/1021 |
| 10,846,329 B1 * | 11/2020 | Nicotera | G06F 16/51 |
| 11,101,876 B2 * | 8/2021 | Kargieman | G06V 10/25 |
| 11,682,168 B1 * | 6/2023 | Nussbaum | G06N 3/006 |
| | | | 345/419 |
| 11,749,074 B2 * | 9/2023 | Attariani | H04W 4/90 |
| | | | 340/539.13 |
| 2002/0120753 A1 * | 8/2002 | Levanon | G06F 3/14 |
| | | | 709/228 |
| 2005/0071054 A1 * | 3/2005 | Weiner | B64G 1/10 |
| | | | 701/13 |
| 2007/0143277 A1 * | 6/2007 | Van De Laar | G06F 16/9577 |
| | | | 707/999.005 |
| 2011/0037692 A1 * | 2/2011 | Mimura | H04N 1/00424 |
| | | | 345/156 |
| 2011/0175914 A1 * | 7/2011 | Levanon | G06T 3/4092 |
| | | | 345/428 |
| 2016/0104059 A1 * | 4/2016 | Wang | G06T 7/20 |
| | | | 382/103 |
| 2016/0132714 A1 * | 5/2016 | Pennypacker | G06F 18/217 |
| | | | 382/103 |
| 2016/0164619 A1 * | 6/2016 | Sennett | H04H 20/59 |
| | | | 455/404.1 |
| 2016/0306824 A1 * | 10/2016 | Lopez | G06F 16/738 |
| 2017/0250751 A1 | 8/2017 | Kargieman et al. | |
| 2017/0351006 A1 * | 12/2017 | Bharadwaj | H04N 23/90 |
| 2018/0172823 A1 * | 6/2018 | Tyc | G01S 19/13 |
| 2018/0310124 A1 * | 10/2018 | Regan | H04W 4/021 |
| 2018/0336408 A1 * | 11/2018 | Arya | F03D 17/00 |
| 2019/0028544 A1 * | 1/2019 | Edgardh | H04W 4/18 |
| 2021/0183214 A1 * | 6/2021 | Attariani | G06Q 10/083 |
| 2022/0038172 A1 * | 2/2022 | Kargieman | G06V 20/176 |
| 2022/0150738 A1 * | 5/2022 | Greenidge | H04B 7/18513 |
| 2022/0164376 A1 * | 5/2022 | Lopez | G06F 16/9535 |
| 2022/0405908 A1 * | 12/2022 | Cowan | G06V 10/70 |
| 2023/0011668 A1 * | 1/2023 | Cowan | G08B 17/005 |
| 2023/0186445 A1 * | 6/2023 | DeLuca | G06N 20/00 |
| | | | 382/100 |

FOREIGN PATENT DOCUMENTS

| | | | | |
|---|---|---|---|---|
| CN | 112565756 A | * | 3/2021 | .......... H04N 19/124 |
| KR | 102090724 B1 | * | 3/2020 | |

OTHER PUBLICATIONS

Denby et al., "Orbital edge computing: Nanosatellite constellations as a new class of computer system." In Proceedings of the Twenty-Fifth International Conference on Architectural Support for Programming Languages and Operating Systems, pp. 939-954. 2020. (Year: 2020).*

"International Search Report and Written Opinion Issued in PCT Application No. PCT/US22/052913", Mailed Date: Feb. 23, 2023, 9 Pages.

"Landsat Missions", Retrieved From : https://www.usgs.gov/core-science-systems/nli/landsat/landsat-8?qt-science_support_page_related_con=0#qt-science_support_page_related_con, Feb. 11, 2013, 7 Pages.

McClain, James, "Cloud Detection in Satellite Imagery", Retrieved From : https://www.azavea.com/blog/2021/02/08/cloud-detection-in-satellite-imagery/, Feb. 8, 2021, 9 Pages.

Colyer, Adrian, "Orbital Edge Computing: Nano Satellite Constellations as a New Class of Computer System", Retrieved from: https://blog.acolyer.org/2020/10/12/orbital-edge-computing/, Oct. 12, 2020, 8 Pages.

* cited by examiner

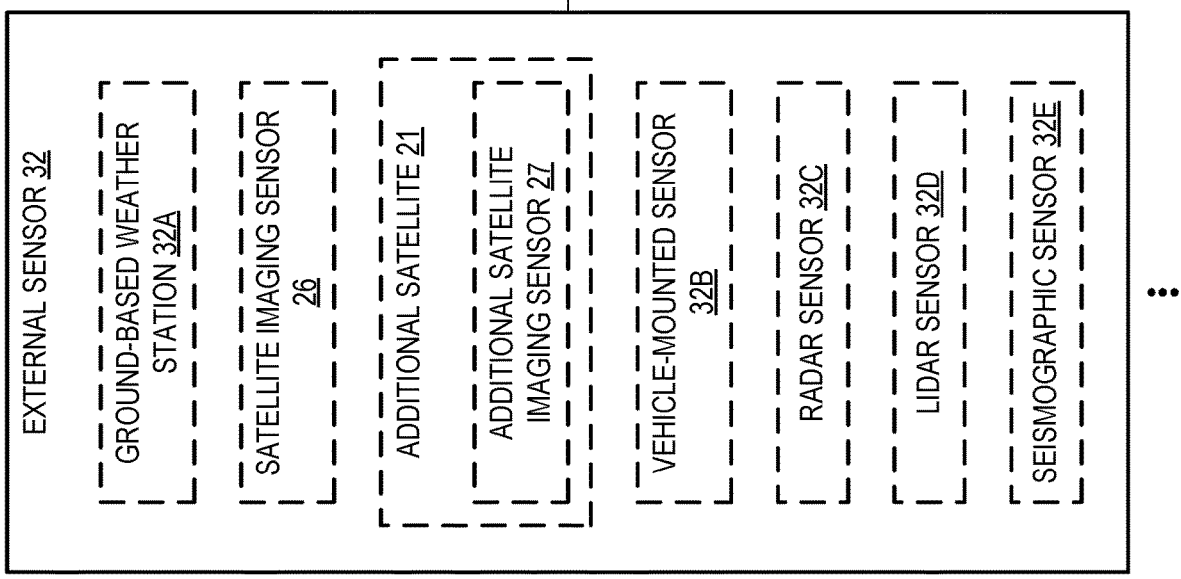

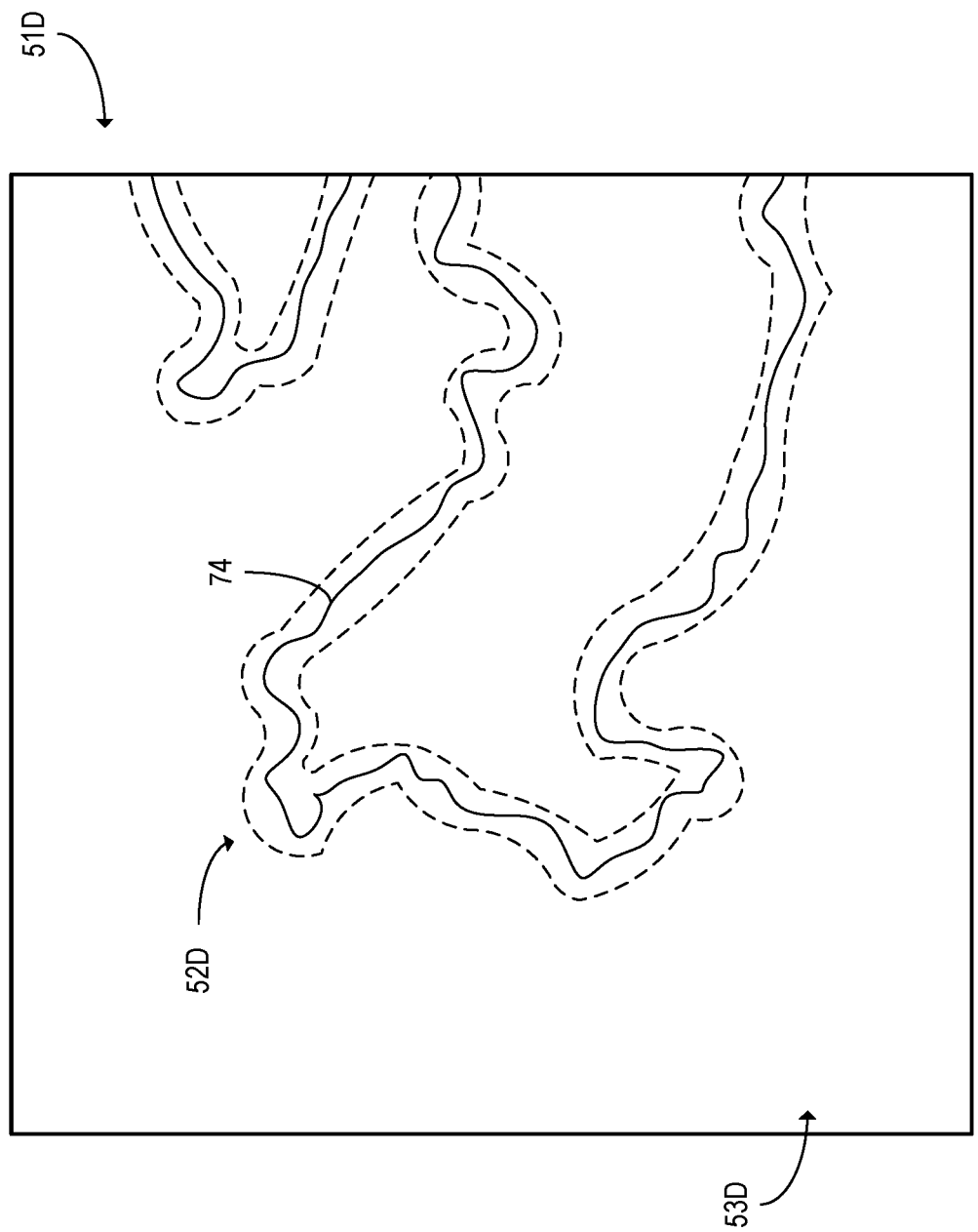

MASK FOR SATELLITE IMAGE DATA

BACKGROUND

The number of satellites used to collect imaging data of the Earth has increased in recent years as new constellations of satellites have been launched into low Earth orbit (LEO). These satellites have orbital periods of approximately 90 minutes and are in communication with ground stations for short time intervals during each orbital period. Since the satellites only communicate with each ground station during a short portion of each orbital period, data transmission from the satellites to the ground stations is bandwidth-constrained, and the satellites typically downlink only a portion of the imaging data they collect. The fraction of imaging data downlinked from the satellites to the ground stations typically decreases as the number of satellites in the satellite constellation increases as a result of distributing the bandwidth of the ground stations among a larger number of satellites.

SUMMARY

According to one aspect of the present disclosure, a computing device is provided, including a processor configured to receive imaging relevance data for a geographic area. The processor may be further configured to generate, based at least in part on the imaging relevance data, image mask instructions specifying a region of interest included in the geographic area. The processor may be further configured to transmit the image mask instructions to a satellite. The processor may be further configured to receive, from the satellite, filtered satellite image data of the region of interest. One or more deprioritized regions of the geographic area outside the region of interest may be excluded from the filtered satellite image data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 schematically shows example imaging relevance data that may be received from example external sensors, according to the example of FIG. 1.

FIG. 6B shows an example fourth image mask generated for the third geographic area in which the region of interest includes an estimated location of a fire boundary, according to the example of FIG. 6A.

DETAILED DESCRIPTION

As discussed above, the imaging data transmitted from satellites to ground stations is subject to bandwidth constraints. One technique for conserving bandwidth is to filter the downlinked data such that imaging data that is likely to be of high value is selectively downlinked to the ground station. Imaging data that is unlikely to be useful may, in contrast, be omitted from the downlinked data when filtering is performed. One technique that may be used to address bandwidth limitations is to filter data before sending, so that all of the data is not sent. However, a technical challenge in the satellite context is determining what data to filter since the importance or relevance of the data is not known at the satellite.

In addition to the bandwidth constraints on the data transmitted from the satellites to the ground stations, the satellites are subject to energy and compute constraints. Satellites are typically powered by photovoltaic cells that provide small quantities of energy to electronic components. In addition, computing hardware included in a satellite typically has low mass and volume in order to decrease the overall size of the satellite and the cost of launching the satellite into orbit. Thus, the energy and compute constraints of the satellites may limit what filtering algorithms are practical to perform at the satellites when filtering the imaging data.

Figure 1:
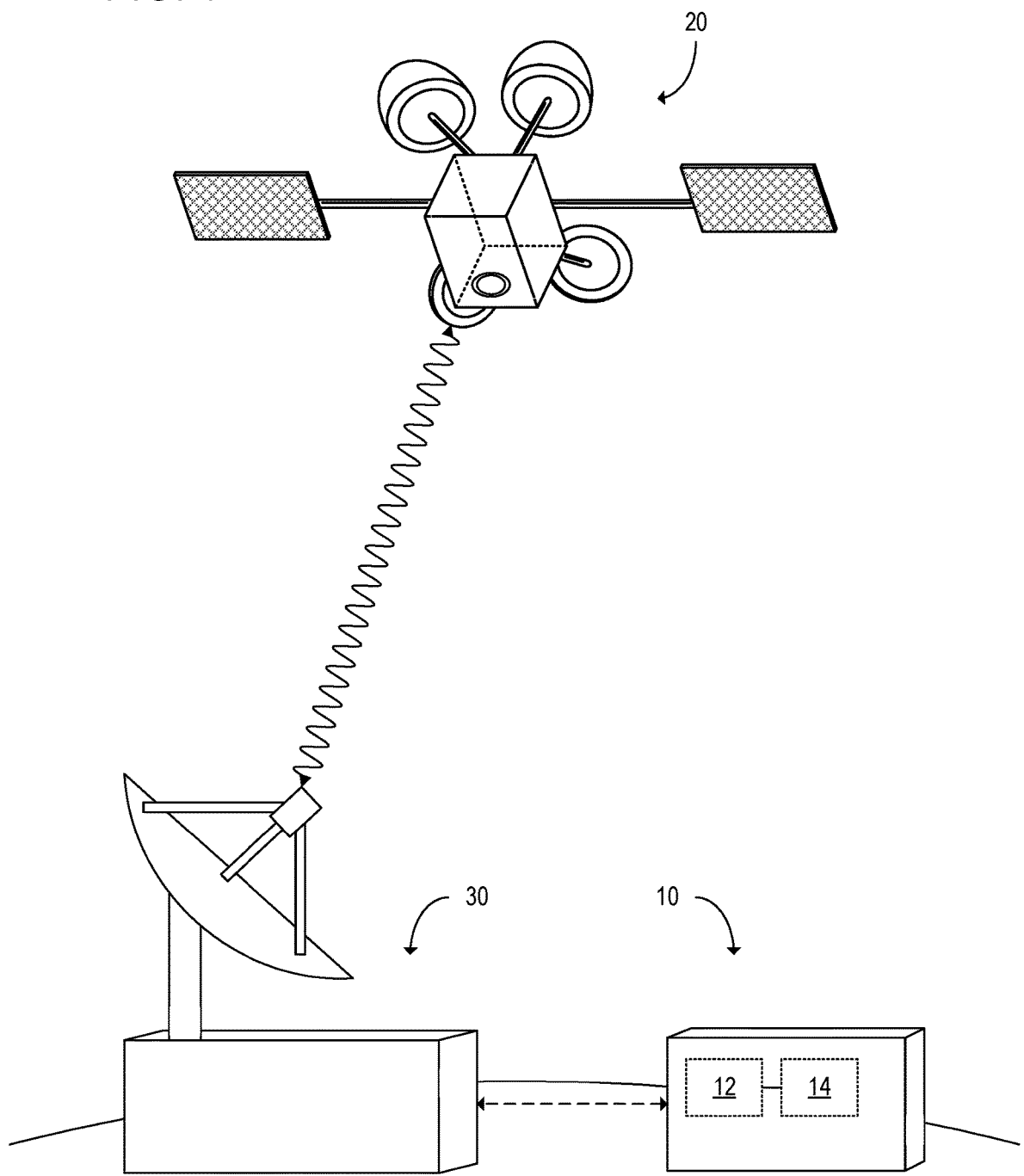
FIG. 1 shows a computing device, a satellite, and a ground station, according to one example.

In order to address the above challenges, a computing device 10 is provided, as shown in the example of FIG. 1. The computing device 10 may be configured to communicate with a satellite 20, which may, for example, orbit the Earth in LEO. Communication between the computing device 10 and the satellite 20 may be conducted via a ground station 30 that is configured to transmit and receive wireless electromagnetic signals to and from the satellite 20. In addition, the ground station 30 may be configured to communicate with the computing device 10 via a wired or wireless connection. In some examples, the computing device 10 may be located on-premises at the ground station 30. In other examples, the computing device 10 may be configured to communicate with the ground station 30 over a network. For example, the computing device 10 may be a server computing device located at a data center.

The computing device 10 may include a processor 12 that is communicatively coupled to memory 14. Other components such as one or more user input devices and/or one or more user output devices may also be included in the computing device 10 in some examples. Although the computing device 10 is depicted in the example of FIG. 1 as a single physical computing device, the functionality of the processor 12 and/or the memory 14 may alternatively be distributed between a plurality of physical computing devices, thereby forming the computing device 10 as a virtual computing device.

Figure 2:
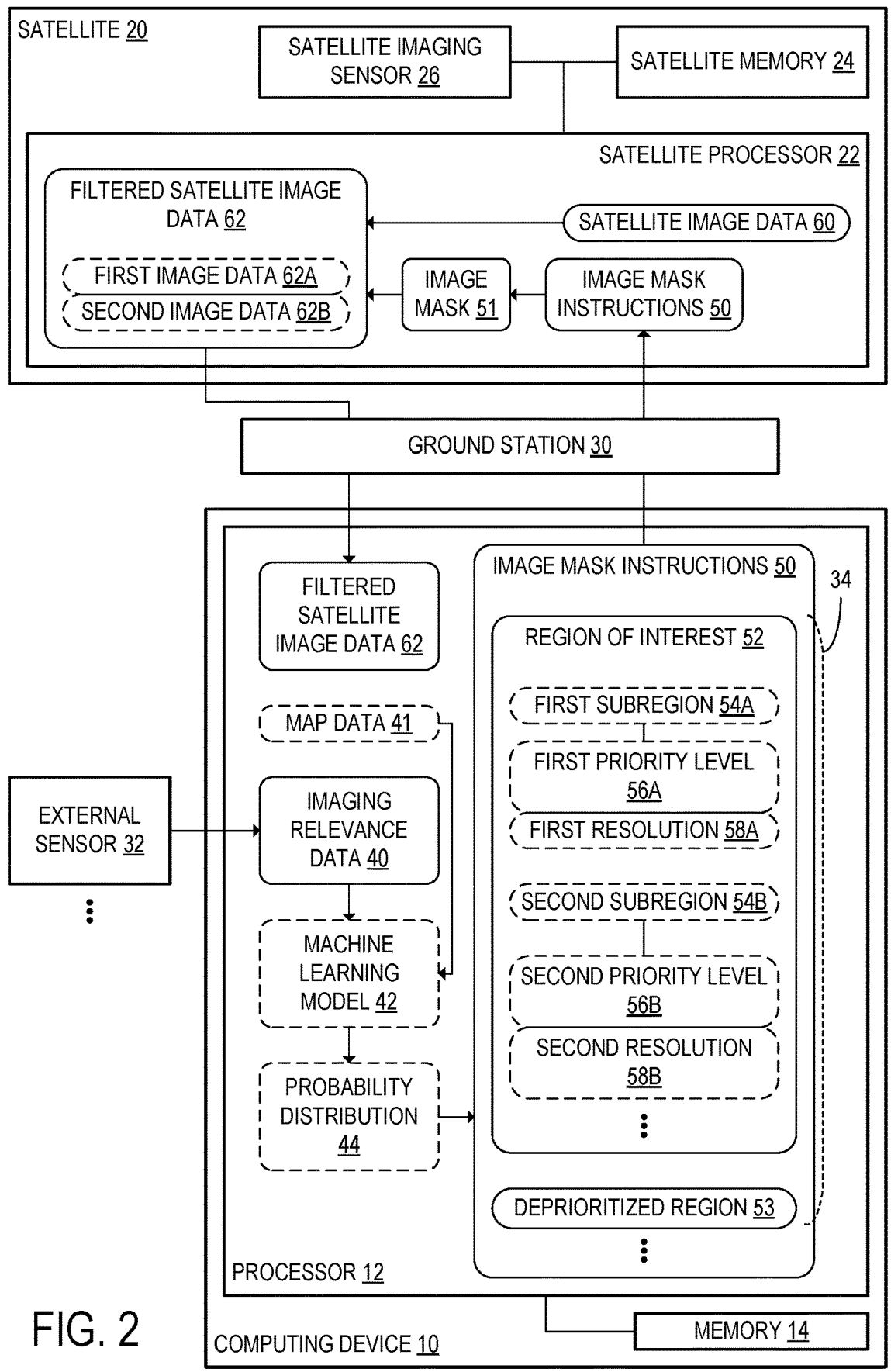
FIG. 2 schematically shows the computing device and the satellite in additional detail when the computing device communicates with the satellite via the ground station, according to the example of FIG. 1.

FIG. 2 schematically shows the computing device 10 in additional detail when the computing device 10 communicates with the satellite 20 via the ground station 30, according to one example. As depicted in the example of FIG. 2, the processor 12 of the computing device 10 may be configured to receive imaging relevance data 40 for a geographic area 34. The imaging relevance data 40 may be received from one or more external sensors 32 configured to communicate with the computing device 10. Each external sensor 32 of the one or more external sensors 32 may be configured to communicate with the computing device 10 directly or over a network. Types of data that may be included in the imaging relevance data 40 are discussed in further detail below.

Based at least in part on the imaging relevance data 40, the processor 12 may be further configured to generate image mask instructions 50 specifying a region of interest 52 included in the geographic area 34. The image mask instructions 50 may specify a boundary between the region of interest 52 and one or more deprioritized regions 53 of the geographic area 34 that are outside the region of interest 52. In some examples, the processor 12 may be configured to generate the image mask instructions 50 at least in part by executing a machine learning model 42 configured to receive the imaging relevance data 40 as input. The machine learning model 42 may be further configured to output the image mask instructions 50 in such examples. Other types of algorithms may additionally or alternatively be used to segment the geographic area 34 into the region of interest 52 and one or more regions outside the region of interest 52.

In addition to the imaging relevance data 40 received from the one or more external sensors 32, map data 41 may additionally be utilized in some examples when generating the image mask instructions 50. For example, the map data 41 may be used as an additional input to the machine learning model 42. The map data 41 may include data related to the geographic area 34 that is not collected from the one or more external sensors 32. For example, the map data 41 may indicate a location of a political boundary between regions of the geographic area 34. As another example, the map data 41 may indicate one or more locations of electrical infrastructure, water supply infrastructure, transportation infrastructure, or some other type of infrastructure. Other types of data for the geographic area 34 that are not collected from the one or more external sensors 32 or computed from the external sensor data may additionally or alternatively be included in the map data 41.

The processor 12 may be further configured to transmit the image mask instructions 50 to the satellite 20. As discussed above, the image mask instructions 50 may be transmitted to the satellite 20 via a ground station 30 that is configured to convey wireless signals to the satellite 20.

In some examples, the image mask instructions 50 may be an image mask 51 that is used to filter satellite image data 60 at the satellite 20, as discussed in further detail below. In other examples, the image mask instructions 50 may be data with which the image mask 51 is configured to be generated at the satellite 20. For example, at least a portion of the imaging relevance data 40 and/or the map data 41 may be included in the image mask instructions 50 and may be used to generate the image mask 51 at the satellite 20.

As depicted in the example of FIG. 2, the satellite 20 may include a satellite processor 22 and satellite memory 24 that provide the satellite 20 with onboard computing capabilities. The satellite 20 may further include a satellite imaging sensor 26 configured to collect satellite image data 60 of the Earth. The satellite image data 60 may include image data of the geographic area 34 for which the image mask 51 is generated.

At the satellite 20, the satellite processor 22 may be configured to apply the image mask instructions 50 to the satellite image data 60 to generate filtered satellite image data 62. In examples in which the image mask instructions 50 directly specify the image mask 51, the satellite processor 22 may be configured to apply the image mask 51 received from the computing device 10 to the satellite image data 60. In examples in which the image mask instructions 50 instead include data from which the image mask 51 is configured to be generated, the satellite processor 22 may be configured to compute the image mask 51 from the image mask instructions 50. The one or more deprioritized regions 53 of the geographic area 34 outside the region of interest 52 may be excluded from the filtered satellite image data 62. Accordingly, a file size of the filtered satellite image data 62 may be lower than a file size of the satellite image data 60.

The satellite processor 22 may be further configured to transmit the filtered satellite image data 62 to the computing device 10. Thus, the processor 12 of the computing device 10 may be further configured to receive, from the satellite 20, the filtered satellite image data 62 of the region of interest 52. Since the file size of the filtered satellite image data 62 may be lower than that of the satellite image data 60, the satellite processor 22 may utilize the limited bandwidth of the connection between the satellite 20 and the ground station 30 more efficiently by selectively transmitting imaging data of the region of interest 52 to the ground station 30.

FIG. 3 shows example types of imaging relevance data 40 and example types of external sensors 32 from which the imaging relevance data 40 may be at least partially received. The imaging relevance data 40 may include data that has been pre-processed at the processor 12 in addition to raw data collected from the one or more external sensors 32. The processor 12 may, for example, utilize multiple different types of sensor data as inputs from which at least a portion of the imaging relevance data 40 is computed.

The imaging relevance data 40 may, for example, include meteorological data 40A. The meteorological data 40A may be received at least in part from one or more ground-based weather stations 32A. In some examples, the meteorological data 40A may be collected at least in part from one or more aerial sensors, such as one or more radar sensors 32C or one or more laser imaging, detection, and ranging (LIDAR) sensors 32D mounted on aircraft and respectively configured to collect radar data 40D and LIDAR data 40E. The meteorological data 40A may, for example, include temperature data, precipitation data, wind speed and direction data, cloud cover data, lighting condition data, air pressure data, humidity data, dew point data, visibility range data, and/or other types of meteorological data.

The imaging relevance data 40 may also, for example, include additional satellite image data 40B received from the satellite 20 or an additional satellite 21. The additional satellite image data 40B may be collected at the satellite imaging sensor 26 of the satellite 20 and/or an additional satellite imaging sensor 27 included in the additional satellite. In some examples, the additional satellite image data 40B may be received at least in part from a plurality of additional satellites 21 that include respective additional satellite imaging sensors 27.

Other types of imaging relevance data 40, such as the meteorological data 40A, may be computed based at least in part on the additional satellite image data 40B in some examples. Computing other imaging relevance data 40 from the additional satellite image data 40B may, in such examples, include performing image classification on the additional satellite image data 40B. This image classification may be performed at an additional machine learning model or using some other algorithm. For example, regions of the geographic area 34 may be classified by surface type (e.g. water, forest, concrete, cropland, grassland, desert, tundra, marsh, etc.) based at least in part on the additional satellite image data 40B.

In some examples, the imaging relevance data 40 may additionally or alternatively include vehicle tracking data 40C for one or more vehicles. The one or more vehicles may be one or more land vehicles, aircraft, watercraft, or spacecraft, and may be manned or unmanned. The vehicle tracking data 40C may, for example, be received from one or more vehicle-mounted sensors 32B included in the one or more vehicles. The vehicle tracking data 40C may additionally or alternatively include the additional satellite image data 40B, radar data 40D collected from one or more radar sensors 32C, LIDAR data collected from one or more LIDAR sensors 32D, or data collected from one or more other types of external sensors 32 located separately from the one or more vehicles.

In some examples, the imaging relevance data 40 may include seismographic data 40F collected from one or more seismographic sensors 32E. The seismographic data 40F may, in such examples, be used to estimate a region of the geographic area that is affected by an earthquake. When estimating the region affected by the earthquake in such examples, the processor 12 may further utilize other types of imaging relevance data 40, such as additional satellite image data 40B and/or LIDAR data 40E.

In some examples, the imaging relevance data 40 may include an estimated location of a fire boundary 40G. The estimated location of the fire boundary 40G may be computed from one or more other types of imaging relevance data 40, such as meteorological data 40A, additional satellite image data 40B, radar data 40D, LIDAR data 40E, and/or one or more other types of imaging relevance data 40.

Figure 4A:
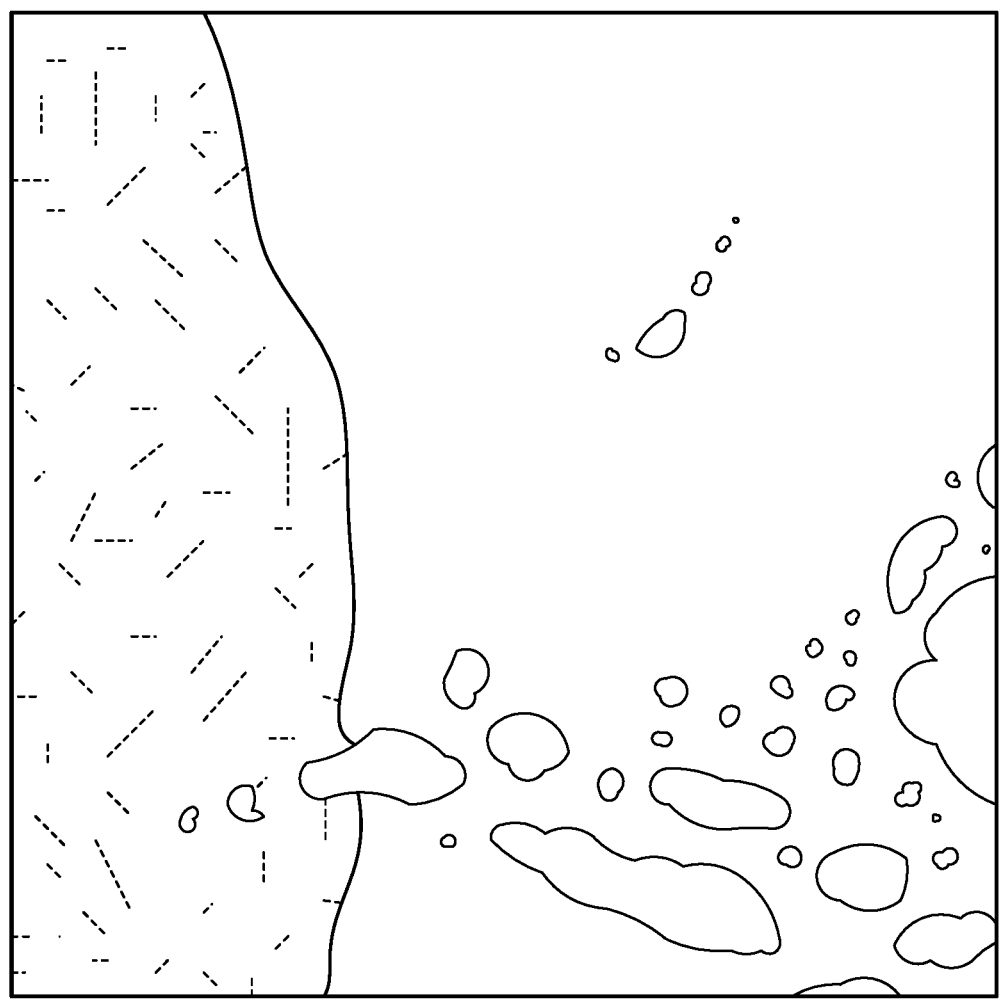
FIG. 4A shows a first geographic area that may be imaged by the satellite, according to the example of FIG. 1.

FIG. 4A shows a first geographic area 34A that may be imaged by the satellite 20 according to one example. In the example of FIG. 4A, the first geographic area 34A is partially obscured by clouds. Regions of the first geographic area 34A that are obscured by clouds may be of lower relevance to the user than the unobscured regions of the first geographic area 34A. Accordingly, in the example of FIG. 4A, the imaging relevance data 40 may be meteorological data that provides evidence of which regions of the first geographic area 34A are covered by clouds. For example, the imaging relevance data 40 may include ground-based meteorological data received from a ground-based weather station. The ground-based weather station may, in such examples, include the one or more external sensors 32 from which the processor 12 is configured to receive the imaging relevance data 40.

Figure 4B:
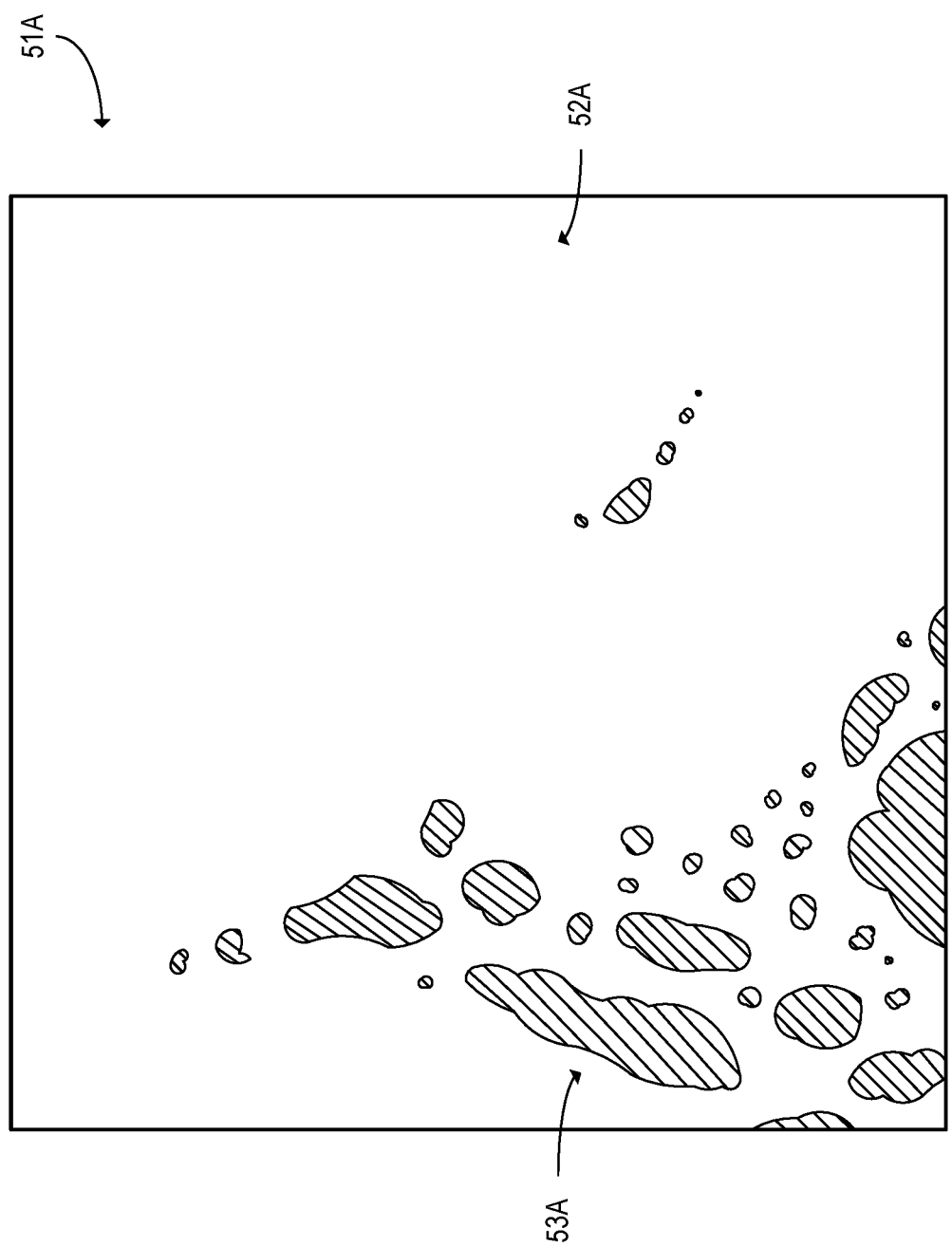
FIG. 4B shows a first image mask generated for the example first geographic area that includes a region of interest, according to the example of FIG. 4A.

FIG. 4B shows a first image mask 51A generated for the example first geographic area 34A of FIG. 4A. The first image mask 51A includes a first region of interest 52A, as well as a first deprioritized region 53A outside the region of interest 52A. The first deprioritized region 53A in the example of FIG. 4B is a region of the first geographic area 34A that the processor 12, based at least on the imaging relevance data 40, determines is likely to be covered by clouds. The first deprioritized region 53A includes non-contiguous regions of the geographic area 34 in the example of FIG. 4B. In other examples, the region of interest 52 may additionally or alternatively be non-contiguous.

Returning to FIG. 2, in some examples, the region of interest 52 may include a first subregion 54A and a second subregion 54B. The image mask instructions 50 may indicate a first priority level 56A and a second priority level 56B for a first subregion 54A and a second subregion 54B of the region of interest 52, respectively. The first priority level 56A and the second priority level 56B may indicate different respective resolutions for the filtered satellite image data 62 in the first subregion 54A and the second subregion 54B, respectively. Thus, when the processor 12 receives the filtered satellite image data 62, the filtered satellite image data 62 may include first image data 62A of the first subregion 54A and second image data 62B of the second subregion 54B that differ in resolution. Thus, the image mask instructions 50 may be utilized at the satellite processor 22 to assign different priority levels to subregions within the region of interest 52. In some examples, the region of interest 52 may include three or more different subregions with respective priority levels.

Figure 4C:
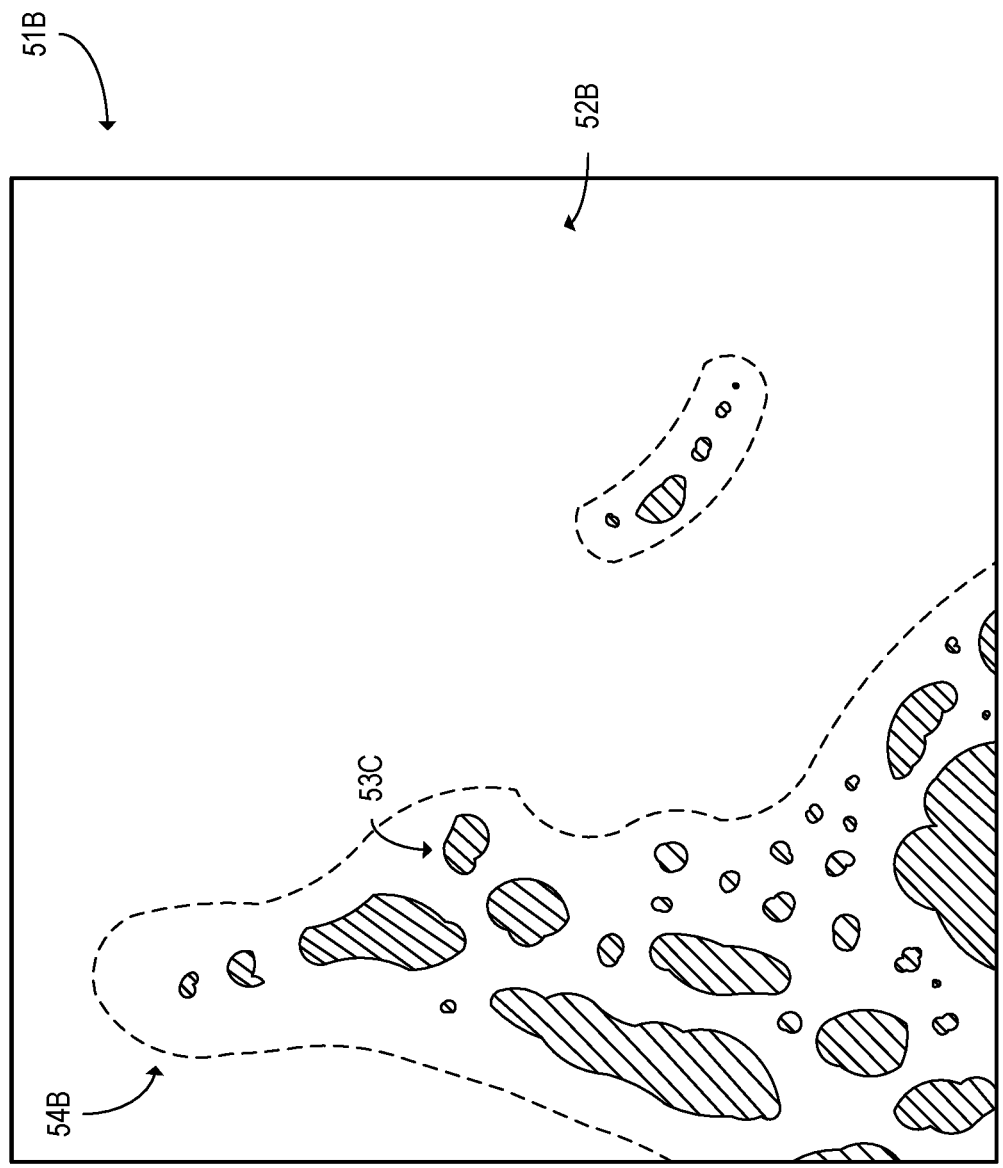
FIG. 4C shows an example second image mask generated for the first geographic area in which the region of interest includes a first subregion and a second subregion, according to the example of FIG. 4A.

FIG. 4C shows an example second image mask 51B generated for the first geographic area 34A of FIG. 4A. The second image mask 51B of FIG. 4C indicates a region of interest that includes a first subregion 54A and a second subregion 54B. The first subregion 54A and the second subregion 54B may have a first priority level 56A and a second priority level 56B, respectively. In addition, the second image mask 51B of FIG. 4C indicates a second deprioritized region 53B, which covers the same area as the first deprioritized region 53A of FIG. 4B.

In some examples, when the processor 12 generates the image mask instructions 50, the processor 12 may be configured to estimate a probability distribution 44 over the geographic area 34. The probability distribution 44 may indicate, for a plurality of locations within the geographic area 34, respective probabilities that satellite image data 60 of those locations is relevant for a user-specified application of the satellite image data 60. In the example of FIGS. 4A-4C, the probability distribution 44 may be a probability distribution of cloud cover over the geographic area 34. In some examples, the probability distribution 44 may be generated at least in part at the machine learning model 42. Subsequently to generating the probability distribution 44, the processor 12 may be further configured to assign the first priority level 56A to the first subregion 54A and assign the second priority level 56B to the second subregion 54B based at least in part on the probability distribution 44. For example, the processor 12 may be configured to assign the first priority level 56A or the second priority level 56B to a location based on whether the probability estimated for that location is above or below a predetermined probability threshold.

Figure 5A:
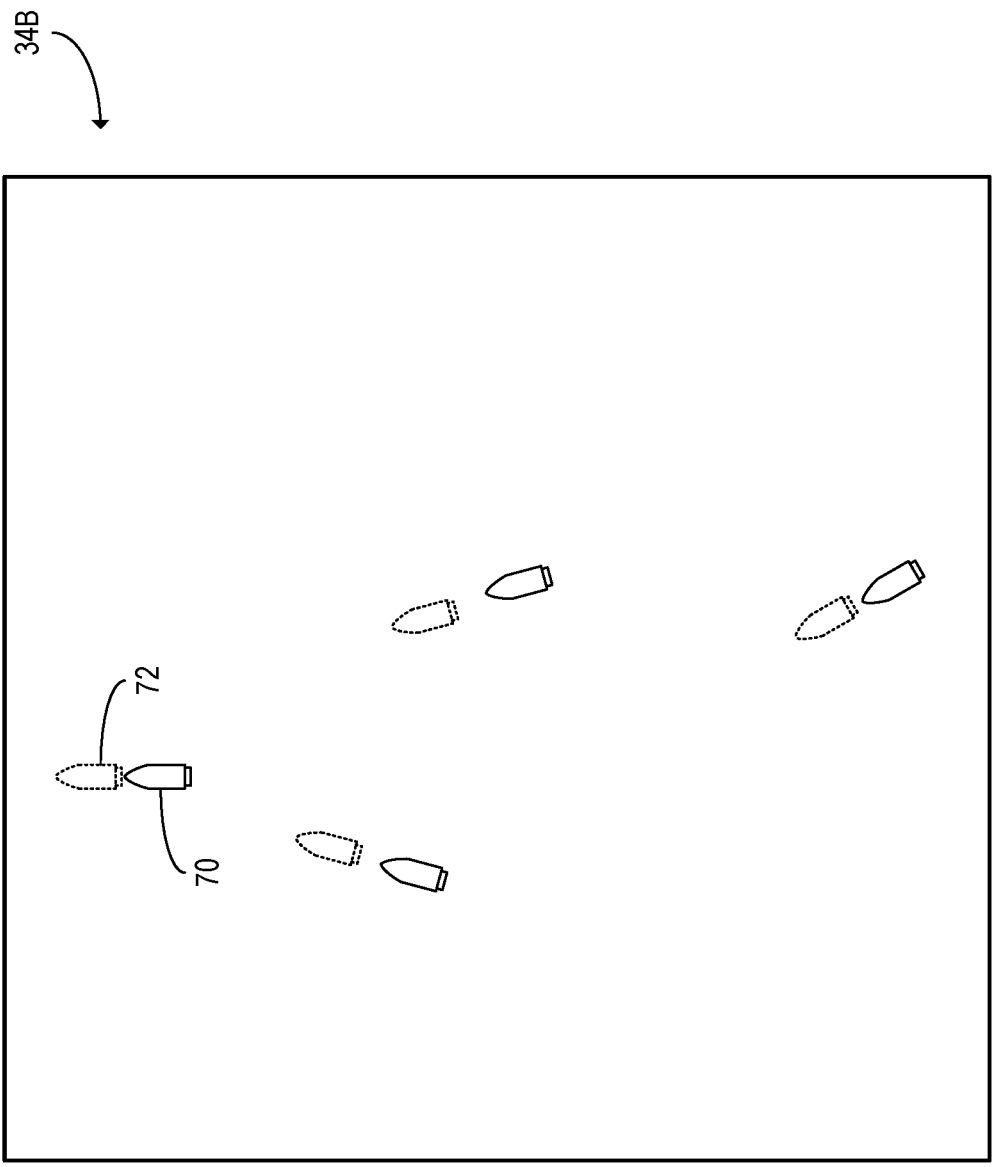
FIG. 5A shows a second geographic area including a plurality of vehicles that may be imaged by a satellite, according to the example of FIG. 1.

FIG. 5A shows a second geographic area 34B according to another example. In the example of FIG. 5A, the imaging relevance data 40 includes vehicle tracking data 40C for one or more vehicles 70. The vehicles 70 depicted in the example of FIG. 5A are ships. As discussed above with reference to FIG. 3, the vehicle tracking data 40C may be received at least in part from one or more vehicle-mounted sensors 32B. In some examples, at least a portion of the vehicle tracking data 40C may additionally or alternatively be additional satellite image data 40B, radar data 40D, LIDAR data 40E, or some other type of sensor data. In addition, vehicle tracking data 40C may be collected for other types of vehicles in other examples.

As depicted in the example of FIG. 5A, the processor 12 may be further configured to compute one or more predicted locations 72 of the one or more vehicles 70. For example, when the vehicle tracking data indicates respective positions and velocities of the one or more vehicles 70, the processor 12 may be configured to extrapolate a respective future location of each of the one or more vehicles 70 based at least in part on the position and velocity indicated for that vehicle 70.

Figure 5B:
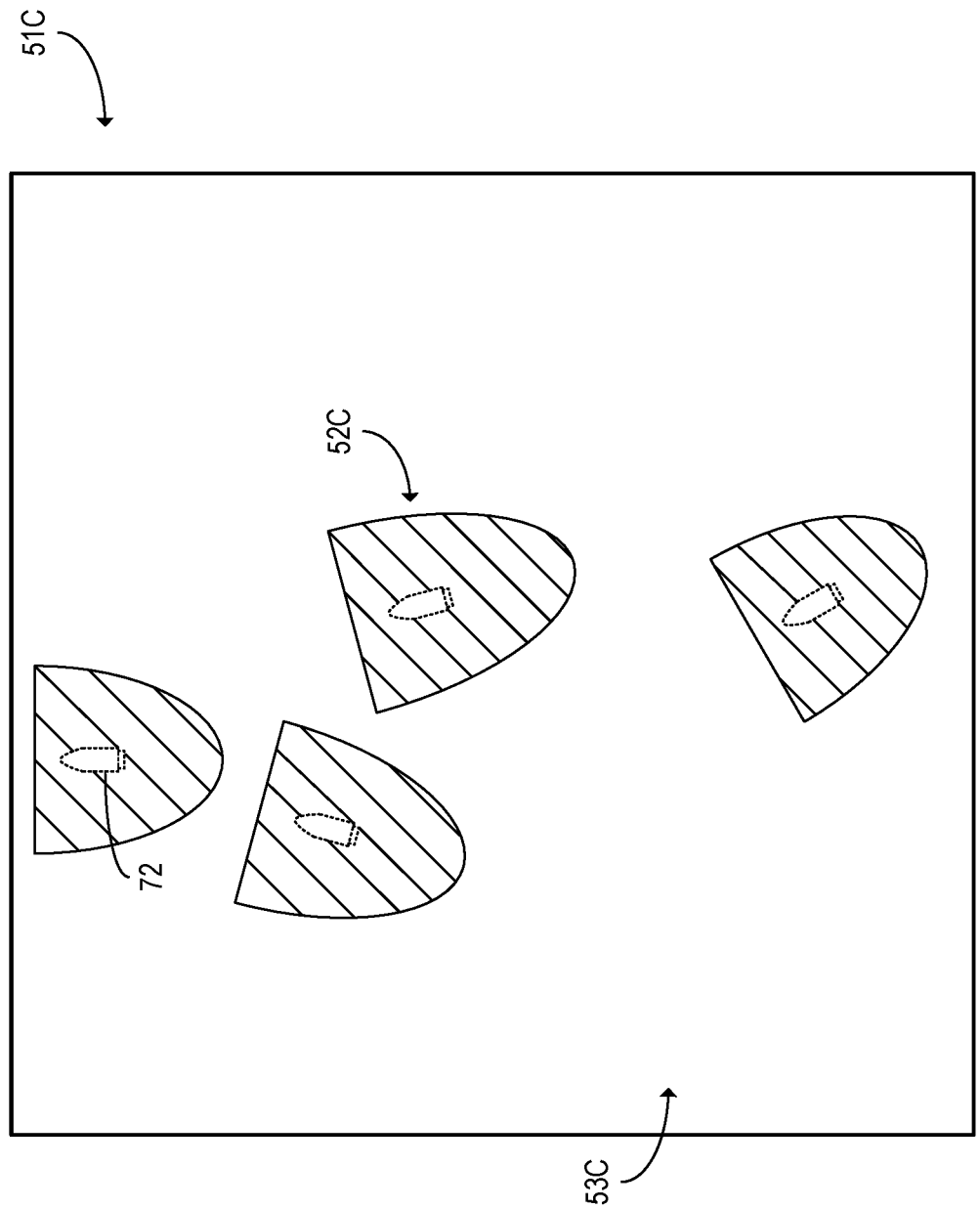
FIG. 5B shows a third image mask generated for the second geographic area in which the region of interest includes predicted locations of the vehicles, according to the example of FIG. 5A.

As shown in a third image mask 51C depicted in of FIG. 5B, the region of interest 52 may include the one or more predicted locations 72 in examples in which the processor 12 is configured to predict one or more predicted locations 72 for one or more vehicles 70. The example third image mask 51C of FIG. 5B includes a third region of interest 52C surrounding the predicted locations 72 of the plurality of vehicles 70 shown in FIG. 5A. The third image mask 51C also includes a third deprioritized region 53C located outside the third region of interest 52C. By filtering the satellite image data 60 with the third image mask 51C of FIG. 5B, the satellite processor 22 may be configured to selectively downlink filtered satellite image data 62 that has a high probability of showing the one or more vehicles 70 while excluding portions of the satellite image data 60 that are less likely to be relevant.

Figure 6A:
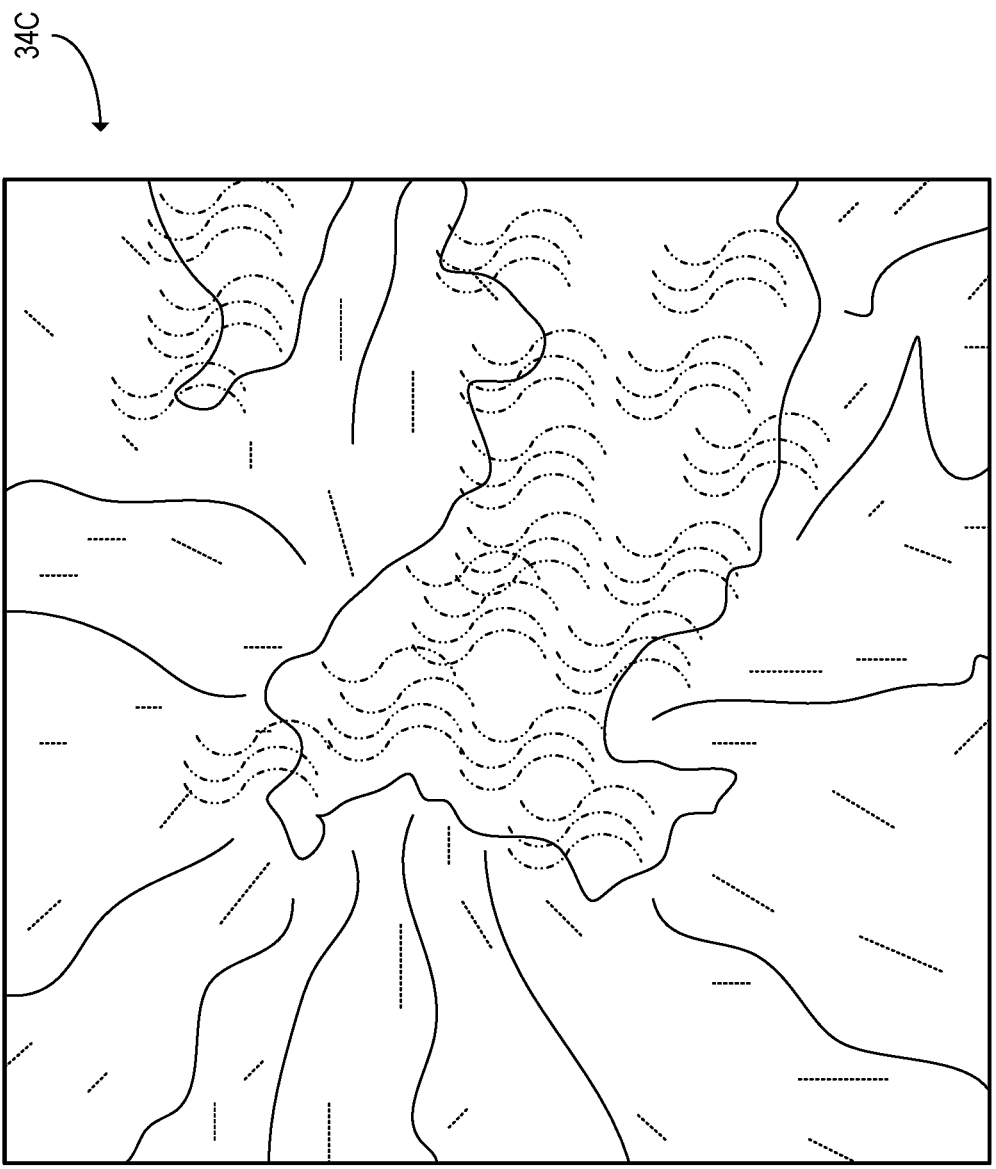
FIG. 6A shows an example third geographic area in which a wildfire is occurring, according to the example of FIG. 1.

FIG. 6A shows an example third geographic area 34C in which a wildfire is occurring. The imaging relevance data 40 received for the third geographic area 34C may include an estimated location of a fire boundary 74, as shown in the example of FIG. 6B. FIG. 6B shows an example fourth image mask 51D generated for the third geographic area 34C. The fourth image mask 51D includes a fourth region of interest 52D within which the estimated location of the fire boundary 74 is located, and further includes a fourth deprioritized region 53D located outside the fourth region of interest 52D. As discussed above, the processor 12 may be configured to compute the estimated location of the fire boundary 74 based at least in part on one or more other types of imaging relevance data 40 received from the one or more external sensors 32. For example, the processor 12 may be configured to estimate the location of the fire boundary 74 based on meteorological data 40A received from a ground-based weather station 32A combined with additional satellite image data 40B received from an additional satellite imaging sensor 27.

Figure 7A:
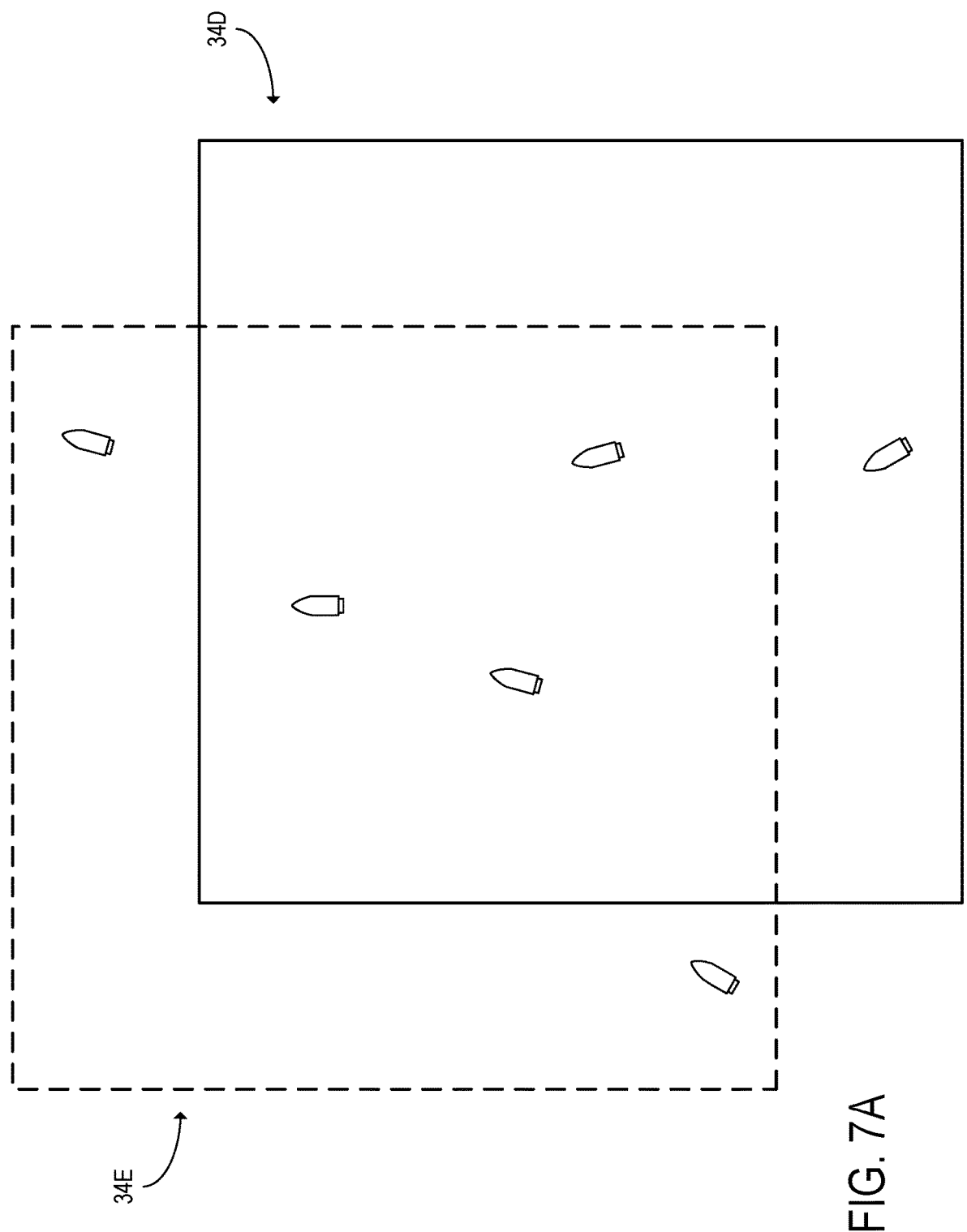
FIG. 7A shows an example fourth geographic area that partially overlaps with an example fifth geographic area that is imaged in additional satellite image data, according to the example of FIG. 1.
Figure 7B:
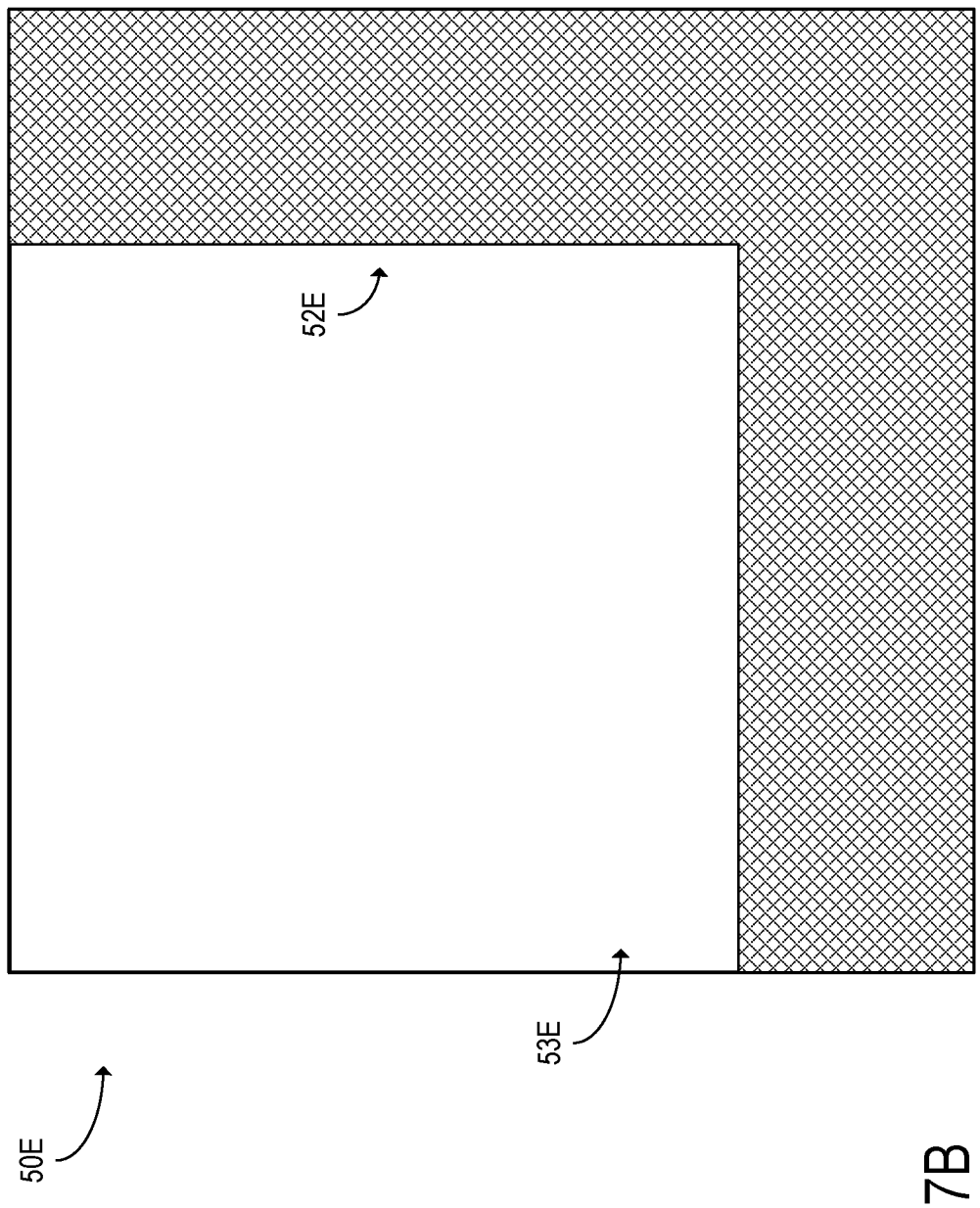
FIG. 7B shows an example fifth image mask in which the region of interest 52E is the region of the fourth geographic area that is not also included in the fifth geographic area, according to the example of FIG. 7A.

In examples in which the imaging relevance data 40 includes additional satellite image data 40B received from the satellite 20 or an additional satellite 21, as discussed above with reference to FIG. 3, the region of interest 52 may be a region of the geographic area 34 not depicted in the additional satellite image data 40B. FIG. 7A shows an example fourth geographic area 34D that partially overlaps with an example fifth geographic area 34E that is imaged in the additional satellite image data 40B. As shown in the example of FIG. 7B, the processor 12 may be further configured to generate a fifth image mask 51E in which the region of interest 52E is the region of the fourth geographic area 34D that is not also included in the fifth geographic area 34E. The portion of the fourth geographic area 34D that overlaps with the fifth geographic area 34E is indicated as a fifth deprioritized region 53E. Accordingly, applying the fifth image mask 51E to the satellite image data 60 may reduce redundancy between the filtered satellite image data 62 and the additional satellite image data 40B.

In the example of FIGS. 7A-7B, the satellite 20 may be configured to perform collaborative filtering with one or more additional satellites 21 to determine the respective regions of interest 52 for which the satellite 20 and the additional satellite 21 are configured to downlink filtered satellite image data 62. This collaborative filtering may be performed at least in part at the processor 12 of the computing device 10 by utilizing additional satellite imaging data 40B when generating the image mask instructions 50. In some examples, collaborative filtering may additionally or alternatively be performed via inter-satellite communications in which the satellite 20 and the one or more additional satellites 21 transmit at least a portion of their respective image mask instructions 50 to each other without transmitting those image mask instructions 50 through the ground station 30. In some examples, at least a portion of the image mask instructions 50 may be transmitted between the satellite 20 and the one or more additional satellites 21 via one or more intermediate satellites included in a satellite network. In examples in which satellite-to-satellite communication is used in collaborative filtering, the image mask instructions 50 may be shared between the satellites is a manner that avoids low-bandwidth connections with the ground station 30.

Figure 8:
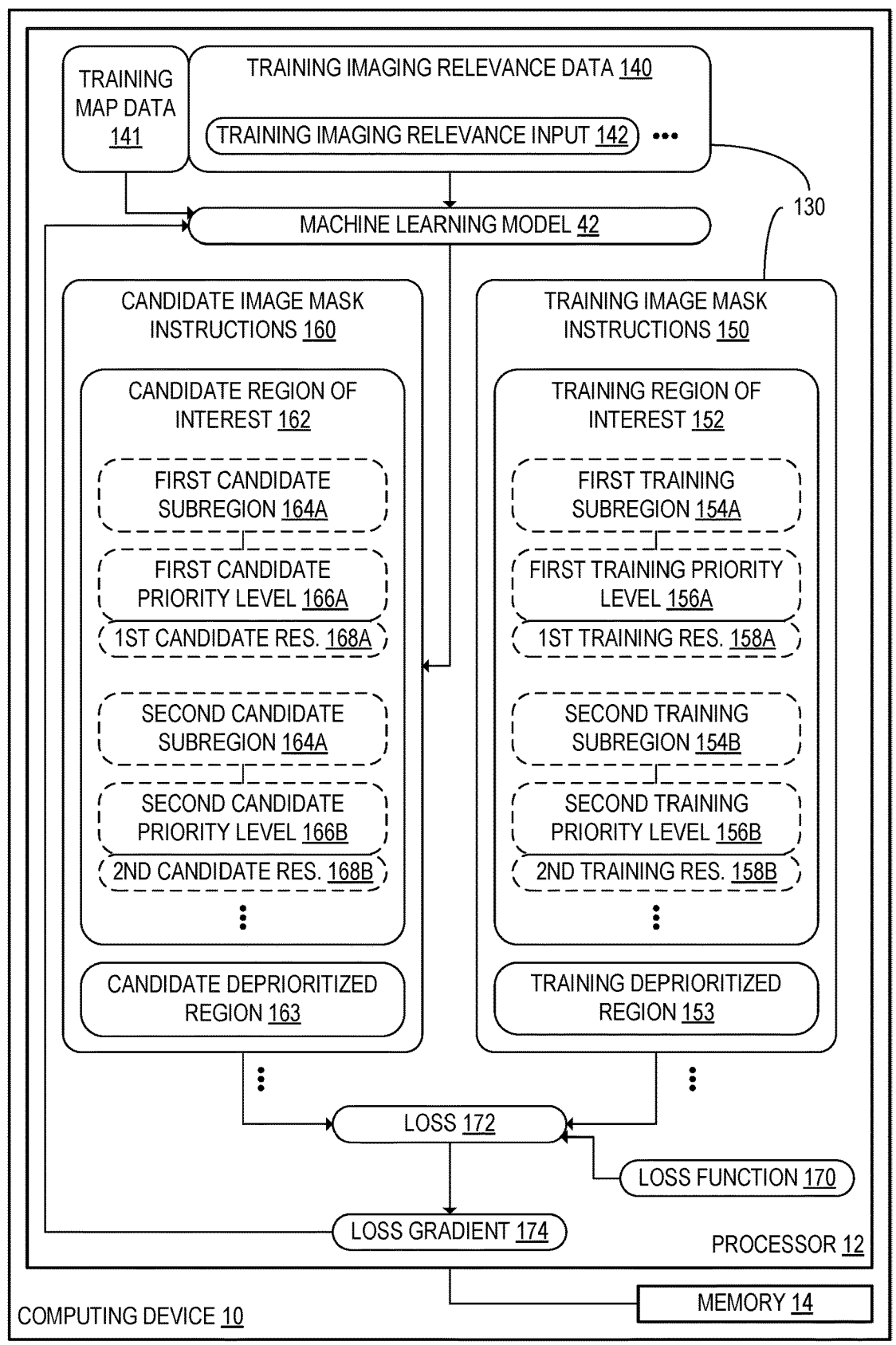
FIG. 8 schematically depicts the computing device during training of a machine learning model, according to the example of FIG. 1.

As discussed above with reference to FIG. 2, the processor 12 may be configured to generate the image mask instructions 50 at least in part by executing a machine learning model 42 in some examples. FIG. 8 schematically depicts the computing device 10 during training of the machine learning model 42. Although the training of the machine learning model 42 is depicted as occurring at the computing device 10 in the example of FIG. 8, the machine learning model 42 may, in other examples, be trained at another computing device and loaded into the memory 14 of the computing device 10 to be executed at runtime.

During training of the machine learning model 42, training data 130 including training imaging relevance data 140 and a plurality of training image mask instructions 150 may be utilized. The training imaging relevance data 140 may include a plurality of training imaging relevance inputs 142 that are respectively paired with the training image mask instructions 150. Each of the training imaging relevance inputs 142 may, for example, include training meteorological data, training additional satellite image data, training vehicle tracking data, training radar data, training LIDAR data, training seismographic data, a training estimated location of a fire boundary, and/or one or more other types of training imaging relevance data 140. The training imaging relevance inputs 142 may each include data of a type associated with one or more external sensors. In some examples, the plurality of training imaging relevance inputs 142 may be paired with respective training map data 141 that indicates training data not associated with a type of external sensor. For example, the training map data 141 may include one or more respective locations of one or more political boundaries. As another example, the training map data 141 may include one or more infrastructure locations.

The training image mask instructions 150 may be a plurality of training image masks or may alternatively be data from which training image masks may be generated. The training image mask instructions 150 may each indicate a respective training region of interest 152 and a respective training deprioritized region 153. In some examples, the training region of interest may include at least a first training subregion 154A and a second training subregion 154B. In such examples, the first training subregion 154A and the second training subregion 154B may respectively have a first training priority level 156A and a second training priority level 156B, which may indicate a corresponding first training resolution 158A and second training resolution 158B. In some examples, the training region of interest 152 may include three or more training subregions with respective training priority levels and training resolutions.

The training of the machine learning model 42 may include a plurality of parameter updating iterations. During each parameter updating iteration, the machine learning model 42 may be configured to receive a training imaging relevance input 142 of the plurality of training imaging relevance inputs 142. The processor 12 may be further configured to generate candidate image mask instructions 160 at the machine learning model 42 based at least in part on the training imaging relevance input 142. The candidate image mask instructions 160 may indicate a candidate region of interest 162 and a candidate deprioritized region 163. In some examples, the candidate region of interest 162 may include a first candidate subregion 164A and a second candidate subregion 164B. The first candidate subregion 164A may have a first candidate priority level 166A that corresponds to a first candidate resolution 168A. Similarly, the second candidate subregion 164A may have a second candidate priority level 166B that corresponds to a second candidate resolution 168B. In some examples, the candidate region of interest 162 may include three or more candidate subregions with respective candidate priority levels and candidate resolutions.

In each of the plurality of parameter updating iterations, subsequently to generating the candidate image mask instructions 160, the processor 12 may be further configured to compute a loss 172 for the machine learning model 42. The processor 12 may be configured to compute the loss 172 using a loss function 170. The loss function 170 may be a function that is minimized when the candidate image mask instructions 160 are an exact match for the training image mask instructions 150, and that increases as a distance between the candidate image mask instructions 160 and the training image mask instructions 150 increases. The processor 12 may be further configured to compute a loss gradient 174 of the loss 172 and to perform gradient descent at the machine learning model 42 using the loss gradient 174. Parameters of the machine learning model 42 may accordingly be updated in each parameter updating iterations. Thus, over the plurality of parameter updating iterations, the machine learning model 42 may learn to generate candidate image mask instructions 160 that more closely match the corresponding training image mask instructions 150 when the machine learning model 42 receives the training imaging relevance inputs 142.

Figure 9A:
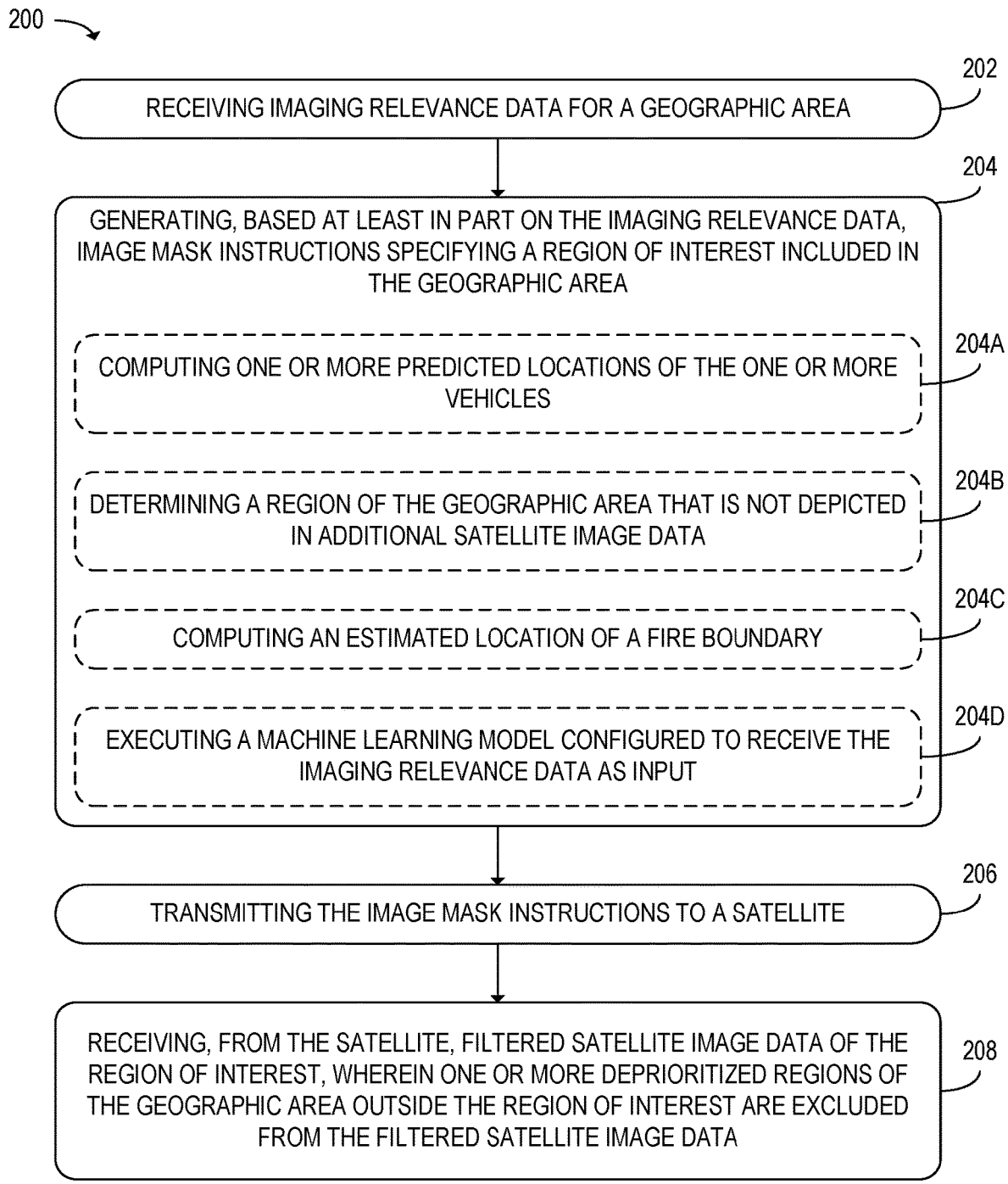
FIG. 9A shows a flowchart of an example method for use with a computing device that is configured to communicate with a satellite, according to the example of FIG. 1.

FIG. 9A shows a flowchart of an example method 200 for use with a computing device that is configured to communicate with a satellite. The method 200 may be used with the computing device 10 of FIG. 1 or with some other computing device. At step 202, the method 200 may include receiving imaging relevance data for a geographic area. The imaging relevance data may be received at least in part from one or more external sensors that are configured to communicate with the computing device. Some example types of data that may be included in the imaging relevance data are meteorological data, additional satellite image data, vehicle tracking data, radar data, LIDAR data, seismographic data, and an estimated location of a fire boundary. The imaging relevance data may, in some examples, include information that is computed from raw data received from the one or more external sensors. In such examples, at least a portion of the imaging relevance data may be computed by combining data collected from a plurality of different types of external sensors. For example, when the imaging relevance data includes meteorological data, the imaging relevance data includes ground-based meteorological data received from a ground-based weather station. The imaging relevance data in this example may further include radar data that is combined with the ground-based meteorological data.

At step 204, the method 200 may further include generating, based at least in part on the imaging relevance data, image mask instructions specifying a region of interest included in the geographic area. For example, when the imaging relevance data includes meteorological data, the region of interest may be a region of the geographic area that is not covered by clouds. The image mask instructions may further specify a deprioritized region included in the geographic area. The image mask instructions may include an image mask or may alternatively include data with which the image mask is configured to be generated at the satellite.

Step 204 may further include additional steps that may be performed when the imaging relevance data includes specific types of information. In examples in which the imaging relevance data includes vehicle tracking data for one or more vehicles, step 204 may include, at step 204A, computing one or more predicted locations of the one or more vehicles. In such examples, the region of interest may include the one or more predicted locations.

In some examples, the imaging relevance data may include additional satellite image data received from the satellite or an additional satellite. In such examples, step 204 may further include, at step 204B, determining a region of the geographic area that is not depicted in the additional satellite image data. At least a portion of the region that is not depicted in the additional satellite image data may be used as the region of interest in such examples.

At step 204C, step 204 may further include, in some examples, computing an estimated location of a fire boundary. The estimated location of the fire boundary may be computed from one or more other types of imaging relevance data. In such examples, the image mask instructions may be generated such that the region of interest includes the estimated location of the fire boundary.

In some examples, at step 204D, step 204 may further include executing a machine learning model configured to receive the imaging relevance data as input. The machine learning model may be further configured to output the image mask instructions. Thus, the machine learning model may be configured to perform segmentation of the geographic area based at least on the imaging relevance data.

At step 206, subsequently to generating the image mask instructions, the method 200 may further include transmitting the image mask instructions to a satellite. The image mask instructions may be transmitted to the satellite via a ground station configured to communicate with the satellite and the computing device. At the satellite, an image mask that is included in the image mask instructions or computed from the image mask instructions may be applied to satellite image data collected by one or more satellite imaging sensors. Thus, the amount of satellite image data downlinked to the ground station may be reduced by removing portions of the satellite image data that are likely to be of low importance to the user.

At step 208, the method 200 may further include receiving, from the satellite, filtered satellite image data of the region of interest. The one or more deprioritized regions of the geographic area outside the region of interest may be excluded from the filtered satellite image data. By excluding the one or more deprioritized regions from the filtered satellite image data, the bandwidth of the downlink from the satellite to the ground station may be utilized more efficiently.

Figure 9B:
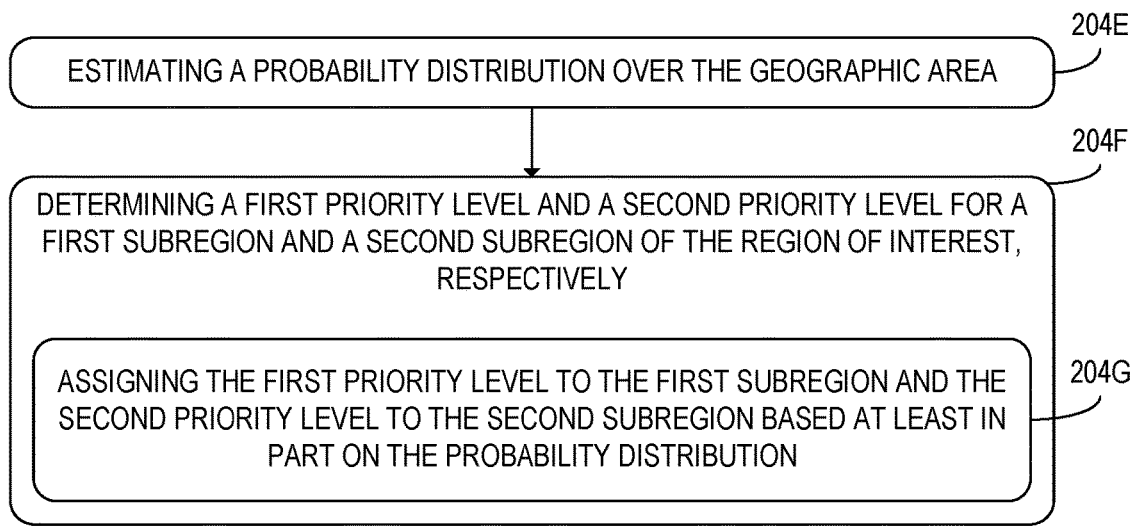
FIG. 9B shows additional steps of the method of FIG. 9A that may be performed in some examples when generating the image mask.

FIG. 9B shows additional steps of the method 200 that may be performed in some examples when generating the image mask instructions at step 204. At step 204E, step 204 may further include estimating a probability distribution over the geographic area. For example, the probability distribution may be a probability distribution of cloud cover over that indicates, for a plurality of locations in the geographic area, respective probabilities that those locations are obscured by clouds.

At step 204F, step 204 may further include determining a first priority level and a second priority level for a first subregion and a second subregion of the region of interest, respectively. Determining the first priority level and the second priority level may include, at step 204G, assigning the first priority level to the first subregion and the second priority level to the second subregion based at least in part on the probability distribution. For example, a predetermined probability threshold may be utilized to determine the location of a boundary between the first subregion and the second subregion. In some examples, the region of interest may be divided into three or more subregions based at least in part on the probability distribution.

In examples in which the region of interest includes at least a first subregion and a second subregion, the image mask instructions may indicate a first resolution for the satellite image data within the first subregion and a second resolution for the satellite image data within the second subregion. Thus, in such examples, the filtered satellite image data may include first image data of the first subregion and second image data of the second subregion that differ in resolution. In examples in which the region of interest includes three or more subregions, the three or more subregions may have three or more corresponding resolutions.

Figure 10:
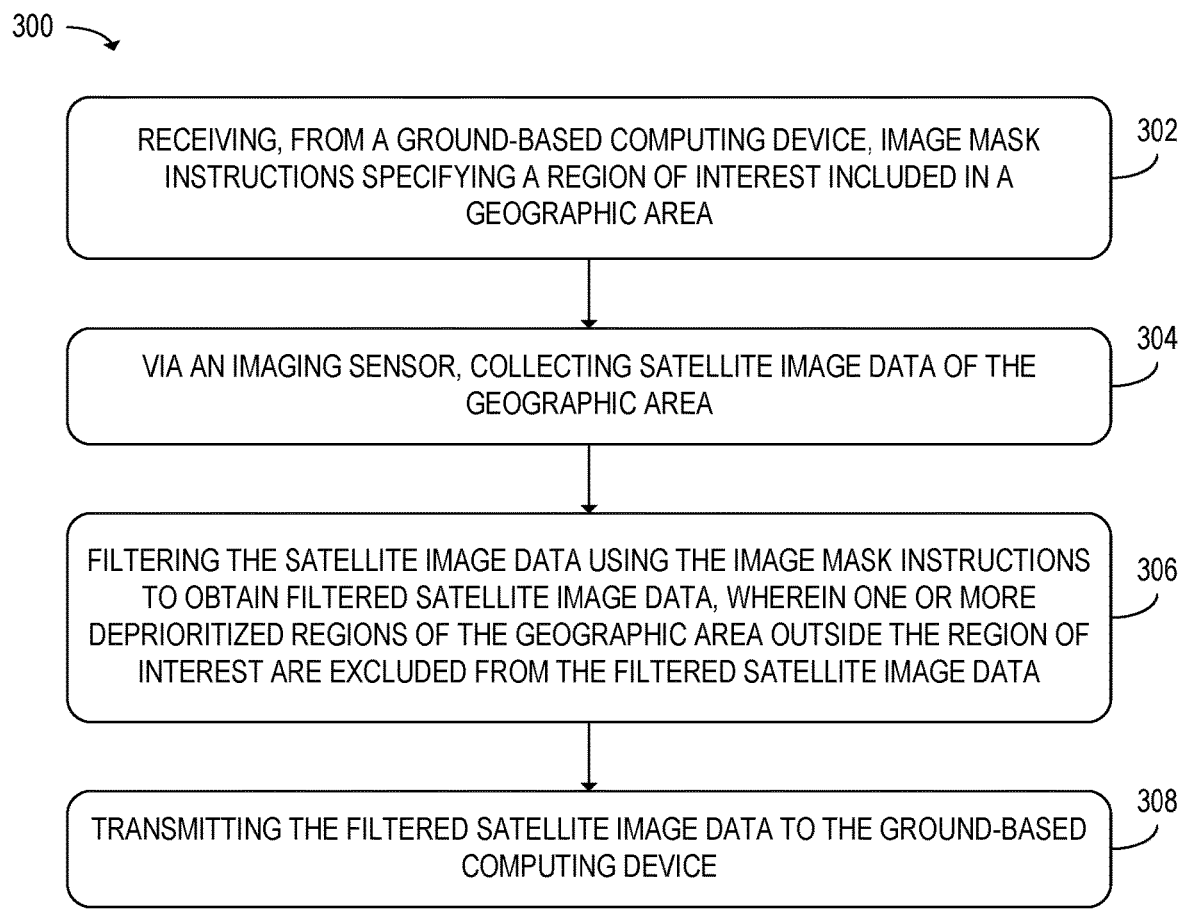
FIG. 10 shows a flowchart of an example method for use at a satellite, according to the example of FIG. 1.

FIG. 10 shows a flowchart of an example method 300 for use at a satellite. The satellite at which the steps of the method 300 are performed may be the satellite 20 of FIG. 1 or some other satellite. The satellite at which the method 300 is performed may include an imaging sensor configured to collect satellite image data of a geographic area. In addition, the satellite may include a satellite processor and satellite memory configured to provide onboard computing capabilities. The satellite may be configured to communicate with a ground station via wireless electromagnetic signals.

At step 302, the method 300 may include receiving, from a ground-based computing device, image mask instructions specifying a region of interest included in a geographic area. The image mask instructions may further specify a deprioritized region of the geographic area that is located outside the region of interest. In some examples, the region of interest may be subdivided into at least a first subregion that has a first priority level and a second subregion that has a second priority level, thereby indicating different levels of prioritization for satellite imaging data of different subregions of the region of interest.

At step 304, the method 300 may further include collecting imaging data of the geographic area via the imaging sensor.

At step 306, the method 300 may further include filtering the satellite image data using the image mask instructions to obtain filtered satellite image data. In examples in which the image mask instructions include the image mask, step 306 may be performed by applying the image mask to the satellite image data. In other examples, performing step 306 may include generating the image mask based at least in part on the image mask instructions and using the image mask generated in this manner to filter the satellite image data. The one or more deprioritized regions of the geographic area outside the region of interest may be excluded from the filtered satellite image data, whereas the region of interest may be included. In examples in which the region of interest includes at least a first subregion and a second subregion, the first subregion and the second subregion may have different resolutions in the filtered satellite image data, as specified by the image mask instructions.

At step 308, the method 300 may further include transmitting the filtered satellite image data to the ground-based computing device. The satellite image data may be transmitted to the ground-based computing device via the ground station.

Using the systems and methods discussed above, satellite image data may be filtered such that regions of satellite images that are more likely to be useful to a user are selectively downlinked to a ground station, whereas other regions of the satellite images are excluded. This selective downlinking allows the limited bandwidth of the connection between the satellite and the ground station to be utilized more efficiently. In addition, in the systems and methods discussed above, the image mask instructions with which the satellite image data is filtered are computed at a ground-based computing device rather than at an onboard processor of the satellite. Generating the image mask instructions at the ground-based computing device allows an image mask to be generated using more compute-intensive processes than would be feasible to perform at the onboard processors of many satellites. Accordingly, the filtering may be performed without exceeding energy and compute constraints of the satellite.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
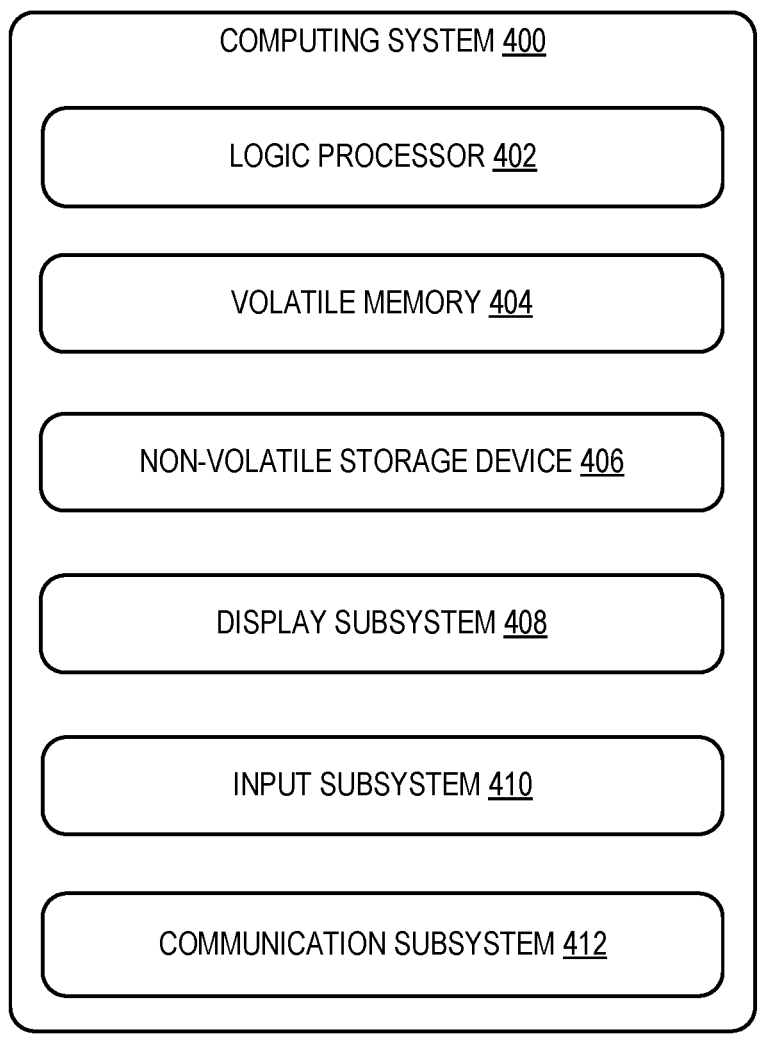
FIG. 11 shows a schematic view of an example computing environment in which the computing device of FIG. 1 may be instantiated.

FIG. 11 schematically shows a non-limiting embodiment of a computing system 400 that can enact one or more of the methods and processes described above. Computing system 400 is shown in simplified form. Computing system 400 may embody the computing device 10 described above and illustrated in FIG. 1. Components of the computing system 400 may be included in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 11.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs discuss several aspects of the present disclosure. According to one aspect of the present disclosure, a computing device is provided, including a processor configured to receive imaging relevance data for a geographic area. The processor may be further configured to generate, based at least in part on the imaging relevance data, image mask instructions specifying a region of interest included in the geographic area. The processor may be further configured to transmit the image mask instructions to a satellite. The processor may be further configured to receive, from the satellite, filtered satellite image data of the region of interest. One or more deprioritized regions of the geographic area outside the region of interest may be excluded from the filtered satellite image data.

According to this aspect, the imaging relevance data may include meteorological data. The region of interest may be a region of the geographic area that is not covered by clouds, as indicated by the meteorological data.

According to this aspect, the image mask instructions may indicate a first priority level and a second priority level for a first subregion and a second subregion of the region of interest, respectively. The filtered satellite image data may include first image data of the first subregion and second image data of the second subregion that differ in resolution.

According to this aspect, the processor may be further configured to estimate a probability distribution over the geographic area. The processor may be further configured to assign the first priority level to the first subregion and the second priority level to the second subregion based at least in part on the probability distribution.

According to this aspect, the processor may be configured to generate the image mask instructions at least in part by executing a machine learning model configured to receive the imaging relevance data as input.

According to this aspect, the processor may be further configured to train the machine learning model using training data that includes a plurality of training imaging relevance inputs paired with a respective plurality of training image mask instructions.

According to this aspect, the imaging relevance data may include additional satellite image data received from the satellite or an additional satellite.

According to this aspect, the region of interest may be a region of the geographic area not depicted in the additional satellite image data.

According to this aspect, the imaging relevance data may include vehicle tracking data for one or more vehicles. The processor may be further configured to compute one or more predicted locations of the one or more vehicles. The region of interest may include the one or more predicted locations.

According to this aspect, the imaging relevance data may include seismographic data.

According to this aspect, the imaging relevance data may include an estimated location of a fire boundary.

According to another aspect of the present disclosure, a method for use with a computing device is provided. The method may include receiving imaging relevance data for a geographic area. The method may further include generating, based at least in part on the imaging relevance data, image mask instructions specifying a region of interest included in the geographic area. The method may further include transmitting the image mask instructions to a satellite. The method may further include receiving, from the satellite, filtered satellite image data of the region of interest. One or more deprioritized regions of the geographic area outside the region of interest may be excluded from the filtered satellite image data.

According to this aspect, the imaging relevance data may include meteorological data. The region of interest may be a region of the geographic area that is not covered by clouds, as indicated by the meteorological data.

According to this aspect, the image mask instructions may indicate a first priority level and a second priority level for a first subregion and a second subregion of the region of interest, respectively. The filtered satellite image data may include first image data of the first subregion and second image data of the second subregion that differ in resolution.

According to this aspect, the method may further include estimating a probability distribution over the geographic area. The method may further include assigning the first priority level to the first subregion and the second priority level to the second subregion based at least in part on the probability distribution.

According to this aspect, generating the image mask instructions may include executing a machine learning model configured to receive the imaging relevance data as input.

According to this aspect, the imaging relevance data may include additional satellite image data received from the satellite or an additional satellite.

According to this aspect, the region of interest may be a region of the geographic area not depicted in the additional satellite image data.

According to this aspect, the imaging relevance data may include vehicle tracking data for one or more vehicles. The method may further include computing one or more predicted locations of the one or more vehicles. The region of interest may include the one or more predicted locations.

According to another aspect of the present disclosure, a satellite is provided, including an imaging sensor configured to collect satellite image data of a geographic area. The satellite may further include a processor configured to receive, from a ground-based computing device, image mask instructions specifying a region of interest included in the geographic area. The processor may be further configured to receive the satellite image data from the imaging sensor. The processor may be further configured to filter the satellite image data using the image mask instructions to obtain filtered satellite image data. One or more deprioritized regions of the geographic area outside the region of interest may be excluded from the filtered satellite image data. The processor may be further configured to transmit the filtered satellite image data to the ground-based computing device.

"And/or" as used herein is defined as the inclusive or $\vee$, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a processor configured to:
receive imaging relevance data for a geographic area, wherein the imaging relevance data is received at least in part as sensor data from one or more external sensors configured to communicate with the computing device;
generate, based at least in part on the imaging relevance data, image mask instructions specifying a region of interest included in the geographic area, wherein:
the image mask instructions indicate a first priority level and a second priority level for a first subregion and a second subregion of the region of interest, respectively; and
the processor is configured to generate the image mask instructions at least in part by:
estimating a probability distribution that includes a plurality of probabilities that satellite image data associated with respective locations within the geographic area is relevant for a user-specified application of the satellite image data; and
assigning the first priority level to the first subregion and the second priority level to the second subregion based at least in part on whether the probabilities associated within the locations, as indicated by the probability distribution, are above or below a predetermined probability threshold;
transmit the image mask instructions to a satellite; and
receive, from the satellite, filtered satellite image data of the region of interest, wherein one or more deprioritized regions of the geographic area outside the region of interest are excluded from the filtered satellite image data.

2. The computing device of claim 1, wherein:
the imaging relevance data includes meteorological data; and
the region of interest is a region of the geographic area that is not covered by clouds, as indicated by the meteorological data.

3. The computing device of claim 1, wherein:
the filtered satellite image data includes first image data of the first subregion and second image data of the second subregion that differ in resolution.

4. The computing device of claim 1, wherein the processor is configured to generate the image mask instructions at least in part by executing a machine learning model configured to receive the imaging relevance data as input.

5. The computing device of claim 4, wherein the processor is further configured to train the machine learning model using training data that includes a plurality of training imaging relevance inputs paired with a respective plurality of training image mask instructions.

6. The computing device of claim 1, wherein the imaging relevance data includes additional satellite image data received from the satellite or an additional satellite.

7. The computing device of claim 6, wherein the region of interest is a region of the geographic area not depicted in the additional satellite image data.

8. The computing device of claim 1, wherein:
the imaging relevance data includes vehicle tracking data for one or more vehicles;
the processor is further configured to compute one or more predicted locations of the one or more vehicles; and
the region of interest includes the one or more predicted locations.

9. The computing device of claim 1, wherein the imaging relevance data includes seismographic data.

10. The computing device of claim 1, wherein the imaging relevance data includes an estimated location of a fire boundary.

11. A method for use with a computing device, the method comprising:
receiving imaging relevance data for a geographic area, wherein the imaging relevance data is received at least in part as sensor data from one or more external sensors configured to communicate with the computing device;
generating, based at least in part on the imaging relevance data, image mask instructions specifying a region of interest included in the geographic area, wherein:
the image mask instructions indicate a first priority level and a second priority level for a first subregion and a second subregion of the region of interest, respectively; and
the method further comprises generating the image mask instructions at least in part by:
estimating a probability distribution that includes a plurality of probabilities that satellite image data associated with respective locations within the geographic area is relevant for a user-specified application of the satellite image data; and
assigning the first priority level to the first subregion and the second priority level to the second subregion based at least in part on whether the probabilities associated within the locations, as indicated by the probability distribution, are above or below a predetermined probability threshold;
transmitting the image mask instructions to a satellite; and
receiving, from the satellite, filtered satellite image data of the region of interest, wherein one or more deprioritized regions of the geographic area outside the region of interest are excluded from the filtered satellite image data.

12. The method of claim 11, wherein:
the imaging relevance data includes meteorological data; and
the region of interest is a region of the geographic area that is not covered by clouds, as indicated by the meteorological data.

13. The method of claim 11, wherein
the filtered satellite image data includes first image data of the first subregion and second image data of the second subregion that differ in resolution.

14. The method of claim 11, wherein generating the image mask instructions includes executing a machine learning model configured to receive the imaging relevance data as input.

15. The method of claim 11, wherein the imaging relevance data includes additional satellite image data received from the satellite or an additional satellite.

16. The method of claim 15, wherein the region of interest is a region of the geographic area not depicted in the additional satellite image data.

17. The method of claim 11, wherein:
the imaging relevance data includes vehicle tracking data for one or more vehicles;
the method further comprises computing one or more predicted locations of the one or more vehicles; and the region of interest includes the one or more predicted locations.

18. A computing device comprising:
a processor configured to:
    receive imaging relevance data for a geographic area, wherein the imaging relevance data includes:
        meteorological data;
        additional satellite image data received from a satellite or another satellite;
        vehicle tracking data for one or more vehicles;
        radar data;
        LIDAR data;
        seismographic data; and/or
        an estimated location of a fire boundary;
    generate, based at least in part on the imaging relevance data, image mask instructions specifying a region of interest included in the geographic area, wherein:
        the image mask instructions indicate a first priority level and a second priority level for a first subregion and a second subregion of the region of interest, respectively; and
        the processor is configured to generate the image mask instructions at least in part by:
            estimating a probability distribution that includes a plurality of probabilities that satellite image data associated with respective locations within the geographic area is relevant for a user-specified application of the satellite image data; and
            assigning the first priority level to the first subregion and the second priority level to the second subregion based at least in part on whether the probabilities associated within the locations, as indicated by the probability distribution, are above or below a predetermined probability threshold;
    transmit the image mask instructions to the satellite; and
    receive, from the satellite, filtered satellite image data of the region of interest, wherein:
        one or more deprioritized regions of the geographic area outside the region of interest are excluded from the filtered satellite image data; and
        the filtered satellite image data includes first image data of the first subregion and second image data of the second subregion that differ in resolution.

\* \* \* \* \*